United States Patent
Okamoto et al.

(10) Patent No.: US 8,691,885 B2
(45) Date of Patent: Apr. 8, 2014

(54) ACTIVE ENERGY RAY-CURABLE INKJET INK COMPOSITION

(71) Applicants: Toyo Ink SC Holdings Co., Ltd., Chuo-ku (JP); Toyo Ink Co., Ltd., Chuo-ku (JP)

(72) Inventors: Mayuko Okamoto, Tokyo (JP); Kazuhiro Jonai, Tokyo (JP); Tohru Konno, Tokyo (JP)

(73) Assignees: Toyo Ink SC Holdings Co., Ltd., Tokyo (JP); Toyo Ink Co., Ltd., Tokyo (JP)

( * ) Notice: Subject to any disclaimer, the term of this patent is extended or adjusted under 35 U.S.C. 154(b) by 0 days.

(21) Appl. No.: 13/658,323

(22) Filed: Oct. 23, 2012

(65) Prior Publication Data

US 2013/0139722 A1    Jun. 6, 2013

(30) Foreign Application Priority Data

Oct. 25, 2011   (JP) .................................. 2011-233856
May 23, 2012   (JP) .................................. 2012-117740

(51) Int. Cl.
  *C08F 2/50*   (2006.01)
  *C08F 2/46*   (2006.01)
  *C08G 61/04*  (2006.01)

(52) U.S. Cl.
  USPC ...................................... 522/6; 522/1; 520/1

(58) Field of Classification Search
  USPC .............................................. 522/6, 1; 520/1
  See application file for complete search history.

(56) References Cited

U.S. PATENT DOCUMENTS

| | | | |
|---|---|---|---|
| 6,508,549 B1 | 1/2003 | Romano, Jr. et al. | |
| 6,513,923 B1 | 2/2003 | Evans et al. | |
| 7,723,397 B2 * | 5/2010 | Husler et al. | 522/36 |
| 2007/0148460 A1 * | 6/2007 | Licht et al. | 428/403 |
| 2011/0177246 A1 | 7/2011 | Dalal et al. | |

FOREIGN PATENT DOCUMENTS

| | | |
|---|---|---|
| EP | 1 637 926 A2 | 3/2006 |
| EP | 2 053 100 A1 | 4/2009 |
| EP | 2 053 101 A1 | 4/2009 |
| JP | 2003-34765 | 2/2003 |
| JP | 2008-87333 | 4/2008 |
| JP | 2008-087334 * | 4/2008 |
| JP | 2008-87334 | 4/2008 |
| JP | 2010-13574 | 1/2010 |
| JP | 2010-013574 * | 1/2010 |

OTHER PUBLICATIONS

Extended Search Report issued Jan. 30, 2013 in European Application No. 12189365.5.

* cited by examiner

*Primary Examiner* — Ling Choi
*Assistant Examiner* — Jessica E Whiteley
(74) *Attorney, Agent, or Firm* — Oblon, Spivak, McClelland, Maier & Neustadt, L.L.P.

(57) ABSTRACT

Specifically provided is a single pass-curable ink having high color reproducibility and high curing properties at the same time and having high dischargeability when used in printing at high frequency and high jetting speed, as compared with conventional ones. An active energy ray-curable inkjet ink composition contains a metal lake pigment of a rhodamine dye as a pigment, and the active energy ray-curable inkjet ink composition may contain 0.5 to 10% by weight of Pigment Violet 1, Pigment Violet 1:1, Pigment Violet 2, Pigment Violet 2:2, Pigment Red 81, Pigment Red 81:1, Pigment Red 81:2, Pigment Red 81:3, Pigment Red 81:4, Pigment Red 81:5, Pigment Red 169, or Pigment Red 173 as the metal lake pigment of the rhodamine dye based on the total weight of the ink.

8 Claims, No Drawings

ACTIVE ENERGY RAY-CURABLE INKJET INK COMPOSITION

TECHNICAL FIELD

The invention relates to active energy ray-curable colored inkjet inks.

BACKGROUND ART

Conventionally, active energy ray-curable inkjet inks, which can be dried more quickly than solvent-type inkjet inks, have been often used in signage printers for high speed printing. Such active energy ray-curable inkjet ink also has high adhesion to base materials, and thus has been often used in flat bed printers for printing on a variety of base materials. Further, the ink compositions have been developed to meet applications.

These printers have a scanning head to meet an increase in size, in coating thickness, or in density. In recent years, as print head technology has advanced, technology that enables a printing head to eject micro-droplets at high frequency has been established. With the merit of digitization, the achievement of this technology has increased the chance of replacing traditional printing methods with inkjet printing, which used to be inferior in productivity or image quality. However, this technological innovation requires the development of ink compositions having high-frequency suitability better than that of conventional ones and having low viscosity and high sensitivity. Lower ink viscosity contributes to an improvement in the accuracy of droplet landing, and thus is a feature required of ink for achieving high-definition image quality. In addition, the substitution of inkjet printing for traditional offset printing also requires an improvement in color reproducibility. Unfortunately, it has been very difficult, particularly for an active energy ray-curable inkjet ink, to satisfy all required properties including image color reproducibility, curing properties, and discharge stability.

If the amount of the application of ink composition droplets is increased to achieve wide color reproducibility, cracking of the cured coating may occur to disturb the image or to degrade the fixity. If an ink composition is prepared with a higher concentration of a pigment so that wide color reproducibility can be obtained, the ink composition may have higher viscosity or contain a higher concentration of coarse particles. This may cause a problem with discharge stability over a long time.

Literature 1 discloses a set of color inkjet ink for use in printing, which not only include magenta, yellow, and cyan ink commonly used, but also include an orange ink containing a water-soluble orange dye and/or a green ink containing a green dye and/or a violet ink containing a violet dye. This enables the production of an image having a better color gamut than that obtained using a traditional ink set. Literature 2 discloses an ink with good color reproducibility and high productivity, which is produced by using a combination of a specific sensitizer and at least one organic pigment having an orange, violet, or green color. However, these techniques can increase the cost and size of the equipment because an increase in the number of ink colors means an increase in the number of printing heads. Thus, it is practically difficult to unlimitedly increase the number of ink colors, and thus there has been a limit to the available image quality.

Literatures 3 and 4 disclose a study in which the color gamut of offset printing is widened using a pigment containing a metal lake pigment of a rhodamine dye. In this study, however, large amounts of resin and a hexafunctional monomer are used, so that the resulting compositions have very high viscosity. Thus, these ink compositions are very difficult to discharge from existing inkjet heads, and it has been desired to create an ink composition suitable for inkjet printing.

CITATION LIST

Patent Literature

Patent Literature 1: JP 2003-34765 A
Patent Literature 2: JP 2010-13574 A
Patent Literature 3: JP 2008-087333 A
Patent Literature 4: JP 2008-087334 A

SUMMARY OF INVENTION

It is an object of an embodiment of the invention to provide an ink composition having high-frequency suitability, low viscosity, high sensitivity, and good color reproducibility so that a digital printer capable of achieving the same printing quality as that of traditional printing and capable of achieving high print productivity can be provided.

Specifically, an embodiment of the invention relates to an active energy ray-curable inkjet ink composition, which comprises a pigment comprising a metal lake pigment of a rhodamine dye.

The invention also relates to the active energy ray-curable inkjet ink composition, wherein the content of the metal lake pigment is 0.5 to 10% by weight based on the ink composition, and the metal lake pigment is selected from the group consisting of Pigment Violet 1, Pigment Violet 1:1, Pigment Violet 2, Pigment Violet 2:2, Pigment Red 81, Pigment Red 81:1, Pigment Red 81:2, Pigment Red 81:3, Pigment Red 81:4, Pigment Red 81:5, Pigment Red 169, or Pigment Red 173.

The pigment is preferably dispersed by using a resin-type pigment dispersing agent having a urethane skeleton.

Preferably, the ink composition further comprises at least one selected from the group consisting of a monofunctional monomer and a bifunctional monomer.

Preferably, the ink composition further comprises an initiator and a sensitizer. The ink composition preferably comprises, as the initiator and the sensitizer, at least one or two or more selected from the group consisting of 2,4,6-trimethylbenzoyldiphenylphosphine oxide, 2,4-diethylthioxanthone, 2-isopropylthioxanthone, bis(2,4,6-trimethylbenzoyl)phenylphosphine oxide, 2,4,6-trimethylbenzoyldiphenylphosphine oxide, 2-benzyl-2-dimethylamino-1-(4-morpholinophenyl)-butanone-1,2-dimethylamino-2-(4-methylbenzyl)-1-(4-morpholinophenyl)butane-1-one, [4-[(4-methylphenyl)thio]phenyl]phenylmethanone, oligo(2-hydroxy-2-methyl-1-(4-(1-methylvinyl)phenyl)propanone, 1-[4-(2-hydroxyethoxy)phenyl]-2-hydroxy-2-methyl-1-propane-1-one, p-dimethylaminobenzoic acid ethyl ester, and 4,4'-bis(dimethylamino)benzophenone. The content of the initiator is preferably from 2 to 25% by weight based on the total amount of the monomer.

According to an embodiment of the invention, there can be provided a single pass-curable ink having high color reproducibility and high curing properties at the same time and having high dischargeability when used in printing at high frequency and high jetting speed, as compared with conventional ones.

As used herein, the term "single pass-curable ink" refers to an ink suitable for use in a printing method capable of producing an image at a desired resolution when a printing material passes once, that is, one time under one or more fixed inkjet heads.

The present specification is related to the subject matters contained in JP 2011-233856 filed on Oct. 25, 2011 and JP 2012-117740 filed on May 23, 2012, and the disclosures of which are incorporated herein by reference in their entirety.

DESCRIPTION OF EMBODIMENTS

In an embodiment of the invention, the active energy ray-curable inkjet ink composition (hereinafter also referred to as the "ink composition") comprises a metal lake pigment of a rhodamine dye. The metal lake pigment of the rhodamine dye is preferably contained in the form of a pigment dispersion in the ink composition. The ink composition is preferably prepared by adding a monomer and an initiator to a pigment dispersion comprising the metal lake pigment of the rhodamine dye. This method allows even a common dispersing machine to achieve sufficient dispersion and thus does not require excessive dispersion energy or long dispersion time. Thus, this method is less likely to degrade the components for the ink composition during the dispersion and makes it possible to prepare a highly stable ink.

Under the conditions of preparing the pigment dispersion, microbeads are preferably used. Specifically, microbeads of 0.1 to 2 mm are preferably used for the preparation of a stable, low-viscosity dispersion. More preferably, microbeads of 0.1 to 0.5 mm are used for the improvement of productivity and for the preparation of a dispersion with good dischargeability. After the dispersion process, the ink composition is preferably filtered through a filter with a pore size of 3 μm or less, more preferably 1 μm or less.

(Pigment Dispersion)

Examples of the metal lake pigment of the rhodamine dye include Pigment Violet 1, Pigment Violet 1:1, Pigment Violet 2, Pigment Violet 2:2, Pigment Red 81, Pigment Red 81:1, Pigment Red 81:2, Pigment Red 81:3, Pigment Red 81:4, Pigment Red 81:5, Pigment Red 169, Pigment Red 173, etc.

These pigments have a very high tinting strength and exhibit good color reproducibility at a low pigment concentration. These pigments also have ideal spectral reflection characteristics as magenta pigments and exhibit higher reflectance in a short wavelength region than other magenta pigments. Thus, these pigments can efficiently give light energy to an initiator and can make the reactivity of an initiator higher even when the same quantity of light is applied. In addition, these pigments have good light resistance as compared with dyes and thus can be resistant to fading and maintain good color reproducibility for a long term in practical use.

There are various other lake pigments such as metal lake pigments of methine dyes and metal lake pigments of azine dyes. However, such other lake pigments should not be used to form the inkjet ink because they have low dispersion stability in the monofunctional or bifunctional monomer used to form the active energy ray-curable inkjet ink, and also have low dischargeability although dischargeability is important quality for the inkjet ink. In contrast, the metal lake pigment of the rhodamine dye has good dispersibility in the monofunctional or bifunctional monomer, and thus can provide good dischargeability, which is important quality for the inkjet ink.

The content of the metal lake pigment of the rhodamine dye may be selected as desired to achieve the desired stability. The content of the pigment in the ink composition is preferably from 0.5 to 10% by weight, more preferably from 1 to 7% by weight, even more preferably from 1.5 to 5% by weight. If the content is 0.5% by weight or more, sufficient color reproduction can be achieved by single-pass printing. If the content is 10% by weight or less, the ink composition can have low viscosity so that it can be discharged stably, and the ink can also have good stability.

The pigment dispersion also preferably comprises a pigment dispersing agent for improving the dispersibility of the pigment and improving the storage stability of the ink composition. Examples of the pigment dispersing agent that may be used include hydroxyl group-containing carboxylic acid esters, high-molecular-weight unsaturated acid esters, high-molecular-weight copolymers, modified polyurethanes, modified polyacrylates, polyether ester-type anionic active agents, polyoxyethylene alkyl phosphates, polyoxyethylene nonyl phenyl ethers, stearylamine acetate, etc. Hereinafter, the "pigment dispersing agent" is also referred to as the "dispersing agent" or the "dispersing resin."

Specific examples of the dispersing agent include products manufactured by BYK-Chemie GmbH, such as Disperbyk 101 (polyaminoamide phosphate salt and acid ester), 107 (hydroxyl group-containing carboxylic acid ester), 110 or 111 (acid group-containing copolymer), 130 (polyamide), 161, 162, 163, 164, 165, 166, 167, 168, or 170 (high-molecular-weight copolymer), or 400, Bykumen (high-molecular-weight unsaturated acid ester), BYK P104 or P105 (high-molecular-weight unsaturated acid polycarboxylic acid), BYK P104S or 240S (high-molecular-weight unsaturated acid polycarboxylic acid and silicone-based material), and Lactimon (long-chain amine, unsaturated acid polycarboxylic acid, and silicone); products by manufactured by Efka Chemicals B.V., such as Efka 44, 46, 47, 48, 49, 54, 63, 64, 65, 66, 71, 701, 764, or 766, and Efka Polymer 100 (modified polyacrylate), 150 (aliphatic modified polymer), 400, 401, 402, 403, 450, 451, 452, 453 (modified polyacrylate), or 745 (copper phthalocyanine-based); products manufactured by Kyoeisha Chemical Co., Ltd., such as FLOWLEN TG-710 (urethane oligomer), FLOWNON SH-290 or SP-1000, and POLYFLOW No. 50E or No. 300 (acrylic copolymer); and products manufactured by Kusumoto Chemicals, Ltd., such as DISPARLON KS-860, 873SN, or 874 (polymer dispersant), #2150 (aliphatic polycarboxylic acid), and #7004 (polyether ester type). Other examples include products manufactured by Kao Corporation, such as HOMOGENOL L-18 (polycarboxylic polymer), EMULGEN 920, 930, 931, 935, 950, or 985 (polyoxyethylene nonyl phenyl ether), ACETAMIN 24 (coconut amine acetate) or 86 (stearylamine acetate); products manufactured by The Lubrizol Corporation, such as Solsperse 5000 (phthalocyanine ammonium salt-based), 13940 (polyester amine-based), 17000 (fatty acid amine-based), 24000GR, 32000, 33000, 39000, 41000, 53000, 76400, 76500, or J100; products manufactured by Nikko Chemicals Co., Ltd., such as Nikkol T106 (polyoxyethylene sorbitan monooleate), MYS-IEX (polyoxyethylene monostearate), and Hexagline 4-0 (hexaglyceryl tetraoleate); products manufactured by Ajinomoto Fine-Techno Co., Inc., such as AJISPER PB821, 822, 824, 827, or 711; and TEGO Dispers 685 manufactured by Tego Chemie Service GmbH.

In particular, resin-type pigment dispersing agents having a urethane skeleton are preferred because they have good high-frequency characteristics and can form pigment dispersions with good storage stability. Such examples include Solsperse 76400, 76500, or J100 manufactured by The Lubrizol Corporation, and Disperbyk 161, 162, 163, 164, 165, 166, 167, or 168.

The content of the dispersing resin may be selected as desired to achieve the desired stability. The ink composition has high flow characteristics when the content of the dispersing resin is from 25 to 150% by weight based on the weight of the pigment. Within this range, the ink composition can be advantageously used because it has good dispersion stability and can retain the same quality as the original even after long-term storage. Based on the weight of the pigment, the content of the dispersing resin is more preferably from 40 to 100% by weight, so that very stable dispersion can be achieved, and the product can have stable dischargeability even in the high-frequency range of 20 kHz or more, which can achieve high accuracy and high productivity.

The pigment dispersion may also contain an organic pigment derivative for further improvement of the dispersibility of the pigment and the storage stability of the ink composition.

In addition, the pigment dispersion preferably comprises an active energy ray-curable monomer. Examples of such a monomer include an acrylic monomer such as a monofunctional acrylic monomer, a bifunctional acrylic monomer, or a tri- or poly-functional acrylic monomer, a vinyl monomer, a vinyl ether monomer, and a heterogeneous monomer having acrylic and vinyl groups in the molecule. To be dischargeable, the inkjet ink composition should have low viscosity, and thus a monofunctional or bifunctional monomer is advantageously used. In particular, the monomer preferably has a viscosity of 1 to 20 mPa·s at 25° C. Hereinafter, the "active energy ray-curable monomer" is also referred to as the "dispersing monomer."

The content of any of these monomers in the pigment dispersion is preferably 50% by weight or more.

As compared with other monomers, such monomers should have particularly low viscosity and a very high level of inkjet suitability and printing stability. From these points of view, such monomers are preferably lauryl acrylate, 1,9-nonanediol diacrylate, 1,10-decanediol diacrylate, tripropylene glycol diacrylate, dipropylene glycol diacrylate, PO-modified neopentyl glycol diacrylate, EO-modified 1,6-hexanediol diacrylate, PO-modified 1,6-hexanediol diacrylate, tert-butylcyclohexyl acrylate, 2-(2-vinyloxyethoxy)ethyl acrylate, and tridecyl acrylate.

In view of dispersibility, a stable, low-viscosity dispersion, monomers such as dipropylene glycol diacrylate (DPGDA), 1,9-nonanediol diacrylate (1,9-NDDA), 1,10-decanediol diacrylate (1,10-DDDA), 2-(2-vinyloxyethoxy)ethyl acrylate (VEEA), and lauryl acrylate (LA) can be exemplified.

(Active Energy Ray-Curable Inkjet Ink)

To form an active energy ray-curable composition, an active energy ray-curable monomer is added to the pigment dispersion. Examples of the active energy ray-curable monomer include, but are not limited to, an acrylic monomer such as a monofunctional acrylic monomer, a bifunctional acrylic monomer, or a tri- or poly-functional acrylic monomer, a vinyl monomer, a vinyl ether monomer, and a heterogeneous monomer having acrylic and vinyl groups in the molecule.

The metal lake pigment of the rhodamine dye is very unstable because it has a structure in which the dye coordinates with the metal. Thus, the metal lake pigment of the rhodamine dye can be dissolved depending on the solvent or active energy ray-curable monomer used. Although the mechanism is unclear, if the metal lake pigment of the rhodamine dye is dissolved, the dissolved dye can absorb active energy rays to cause a curing failure. The dissolved dye can also be degraded by active energy rays, so that the color gamut can be extremely narrowed.

If a tri- or poly-functional monomer, which has relatively high viscosity, is used in combination with the metal lake pigment of the rhodamine dye, the resulting ink can have low viscosity stability, and its dischargeability can degrade over time, although the reason is unclear. Thus, in an embodiment of the invention, a tri- or poly-functional monomer is not suitable for use as a main monomer. As used herein, the term "main monomer" refers to a monomer whose content is the highest among the monomers in the ink.

Examples of the monofunctional monomer include phenoxyethyl acrylate, benzyl(meth)acrylate, (ethoxylated or propoxylated) 2-phenoxyethyl(meth)acrylate, dicyclopentenyl(oxyethyl)(meth)acrylate, phenoxydiethylene glycol (meth)acrylate, 2-methoxyethyl(meth)acrylate, methoxytriethylene glycol(meth)acrylate, 2-ethoxyethyl(meth)acrylate, ethoxyethoxyethyl(meth)acrylate, methoxydipropylene glycol(meth)acrylate, dipropylene glycol(meth)acrylate, β-carboxylethyl(meth)acrylate, trimethylolpropaneformal(meth)acrylate, isoamyl(meth)acrylate, cyclohexyl(meth)acrylate, tetrahydrofurfuryl(meth)acrylate, isobornyl(meth)acrylate, dicyclopentanyl(meth)acrylate, isooctyl(meth)acrylate, lauryl(meth)acrylate, 2-hydroxy-3-phenoxypropyl(meth)acrylate, 1,4-cyclohexanedimethanol(meth)acrylate, 2-hydroxyethyl(meth)acrylate, 2-hydroxypropyl(meth)acrylate, 4-hydroxybutyl(meth)acrylate, acryloyl morpholine, N-vinylcaprolactam, N-vinylpyrrolidone, N-vinylformamide, and N-acryloyloxyethylhexahydrophthalimide.

Examples of the bifunctional monomer include ethylene glycol diacrylate, diethylene glycol diacrylate, triethylene glycol diacrylate, 1,6-hexanediol di(meth)acrylate, neopentyl glycol diacrylate, 1,9-nonanediol diacrylate, 1,10-decanediol diacrylate, hydroxypivalate neopentyl glycol diacrylate, dipropylene glycol diacrylate, tripropylene glycol diacrylate, polyethylene glycol diacrylate, trimethylolpropane triacrylate, ethoxylated trimethylolpropane triacrylate, propoxylated trimethylolpropane triacrylate, pentaerythritol triacrylate, dipentaerythritol hexaacrylate, tri(2-hydroxyethyl isocyanurate)triacrylate, propoxylated glyceryl triacrylate, 2-(2-vinyloxyethoxy)ethyl acrylate, urethane acrylate, epoxyacrylate, and polyester acrylate.

These monomers may be used alone or in combination of two or more as needed. To be dischargeable, the inkjet ink should have low viscosity, and thus the monofunctional or bifunctional monomer is advantageously used. Particularly preferred are monomers selected from lauryl acrylate, 1,9-nonanediol diacrylate, 1,10-decanediol diacrylate, tripropylene glycol diacrylate, dipropylene glycol diacrylate, PO-modified neopentyl glycol diacrylate, EO-modified 1,6-hexanediol diacrylate, PO-modified 1,6-hexanediol diacrylate, tert-butylcyclohexyl acrylate, 2-(2-vinyloxyethoxy)ethyl acrylate, and tridecyl acrylate. These monomers can be advantageously used because they have high curing properties and relatively low viscosity. These monomers can also be advantageously used for the purpose of suppressing image blurring during printing because the metal lake pigment of the rhodamine dye has low solubility in any of them.

The content of the monomer in the ink contributes to the properties of the ink, such as curing properties and dischargeability. Thus, the total content of the monofunctional and bifunctional monomers in the ink composition is preferably 50% by weight or more, so that the inkjet ink can have high curing properties and good dischargeability. The content is more preferably 70% by weight or more, so that the ink composition can have sufficiently high curing properties even at low illuminance.

Besides the polymerizable monomers described above, an oligomer or a prepolymer may also be used in the ink composition. Examples of such an oligomer or a prepolymer include products manufactured by DAICEL-UCB Co., Ltd., such as EBECRYL 230, 244, 245, 270, 280/151B, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002, or 2100, KRM 7222, KRM 7735, 4842, 210, 215, 4827, 4849, 6700, 6700-20T, 204, 205, 6602, 220, 4450, or 770, IRR 567, 81, 84, 83, 80, 657, 800, 805, 808, 810, 812, 1657, or 1810, IRR 302, 450, 670, 830, 835, 870, 1830, 1870, or 2870, IRR 267 or 813, IRR 483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, or 3702, RDX 63182 or 6040, and IRR 419; products manufactured by Sartomer Company, such as CN104, CN120, CN124, CN136, CN151, CN2270, CN2271E, CN435, CN454, CN970, CN971, CN972, CN9782, CN981, CN9893, and CN991; products manufactured by BASF, such as Laromer EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, P09026V, or PE9027V; products manufactured by COGNIS, such as PHOTOMER 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, or 3660; products manufactured by Negami Chemical Industrial Co., Ltd., such as Art-Resin UN-9000HP, 9000PEP, 9200A, 7600, 5200, 1003, 1255, 3320HA, 3320HB, 3320HC, 3320HS, 901T, 1200TPK, 6060PTM, or 6060P; products manufactured by The Nippon Synthetic Chemical Industry Co., Ltd., such as SHIKOH UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, or 2750B; and products manufactured by Nippon Kayaku Co., Ltd., such as KAYARAD R-280, R-146, R-131, R-205, EX-2320, R-190, R-130, R-300, C-0011, TCR-1234, ZFR-1122, UX-2201, UX-2301, UX-3204, UX-3301, UX-4101, UX-6101, UX-7101, MAX-5101, MAX-5100, MAX-3510, or UX-4101.

The ink composition may contain an organic solvent for making its viscosity low and for improving wettability or spreadability on base materials. Examples of the organic solvent include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate; glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate, and dipropylene glycol acetate dibutyrate; glycols such as ethylene glycol, diethylene glycol, triethylene glycol, propylene glycol, and dipropylene glycol; glycol ethers such as ethylene glycol monobutyl ether, propylene glycol monomethyl ether, propylene glycol monobutyl ether, diethylene glycol monoethyl ether, diethylene glycol diethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactic acid esters such as methyl lactate, ethyl lactate, propyl lactate, and butyl lactate. Particularly preferred are ethylene glycol monobutyl ether acetate and diethylene glycol diethyl ether.

In view of curing properties, the content of the organic solvent in the ink composition is preferably 10% by weight or less, more preferably 7% by weight or less, in particular, preferably 5% by weight or less.

The content of water in the ink composition is preferably 5% by weight or less. If the water content is 5% by weight or less, the metal lake pigment of the rhodamine dye can be well dispersed, and not only the dischargeability of the ink can be stable over time, but also the metal lake pigment of the rhodamine dye can be prevented from being partially decomposed, so that a reduction in chroma can be prevented. The water content is more preferably 1% by weight or less.

The term "active energy ray" is intended to include electron beams, ultraviolet rays, infrared rays, and other rays capable of influencing the electron orbit in the substance being irradiated and capable of triggering a polymerization reaction of radials, cations, anions, or other species. The active energy ray may be of any type capable of inducing a polymerization reaction, and is not restricted to the above.

When ultraviolet light is applied as the active energy ray, examples of light sources that may be used include high-pressure mercury lamps, metal halide lamps, low-pressure mercury lamps, ultra-high pressure mercury lamps, ultraviolet lasers, LEDs, and sunlight. In view of convenience, cost, and other advantages, ultraviolet radiation devices are often used as active energy ray sources to be installed in printing machines.

A photo-radical polymerization initiator or a sensitizer may be used for curing with the active energy ray.

The photo-radical polymerization initiator or the sensitizer may be selected as desired depending on the curing rate, the physical properties of the curable coating, or the colorant.

Good curing properties can be achieved using, as the initiator or sensitizer, 2,4,6-trimethylbenzoyldiphenylphosphine oxide, bis(2,4,6-trimethylbenzoyl)phenylphosphine oxide, 2,4-diethylthioxanthone, 2-isopropylthioxanthone, oligo(2-hydroxy-2-methyl-1-(4-(1-methylvinyl)phenyl)propanone), 2-benzyl-2-dimethylamino-1-(4-morpholinophenyl)-butanone-1,2-dimethylamino-2-(4-methylbenzyl)-1-(4-morpholine-4-yl-phenyl)butane-1-one, [4-[4-methylphenyl]

thio]phenyl]phenylmethanone, p-dimethylaminobenzoic acid ethyl ester, 1-[4-(2-hydroxyethoxy)phenyl]-2-hydroxy-2-methyl-1-propane-1-one, or 4,4'-bis(dimethylamino)benzophenone. More preferably, two or more of these initiators are used together, so that higher curing properties can be achieved.

Based on the weight of all polymerizable monomers, the content of the polymerization initiator in the ink composition is preferably from 2 to 25% by weight, more preferably from 5 to 25% by weight, even more preferably from 10 to 25% by weight. When the content of the initiator is from 2 to 25% by weight, high curing rate and good color reproduction can be achieved at the same time.

The ink composition may also contain a known additive such as a leveling agent, an anti-foaming agent, a fluidity modifier, a fluorescent brightening agent, a polymerization inhibitor, or an antioxidant, as long as the desired properties are satisfied.

The ink composition preferably has a viscosity of 5 to 14 mPa·s at 25° C. If the viscosity is 5 mPa·s or more, the ink composition will have good dischargeability. If the viscosity is 14 mPa·s or less, discharge accuracy will not decrease, and image quality will be less likely to decrease. The ink composition more preferably has a viscosity of 6 to 12 mPa·s so that it can have high-frequency suitability.

EXAMPLES

Hereinafter, the invention is more specifically described with reference to the examples, which however are not intended to limit the scope of the invention at all. In the examples, the term "parts" means "parts by weight," unless otherwise specified.
(Preparation of Pigment Dispersions)

As shown in Table 1, a pigment, a dispersing resin (resin-type pigment dispersing agent), and a monomer were mixed and then dispersed using a microbead-type dispersing machine (DCP mill) for 1 hour to form each of pigment dispersions A to AE. The dispersion was performed by using 0.3-mm-diameter-type Zr beads at a volume filling rate of 75%.

The dispersing resins used are described after Table 1, in which DR-A, DR-B, and DR-C are each a dispersing resin having a urethane skeleton, DR-D and DR-E are each a polyester amine-type dispersing resin.
(Preparation of Ink)

As shown in Tables 2 and 3, a monomer mixture liquid was slowly added to 20 parts of each resulting pigment dispersion and stirred to form an ink precursor. Each polymerization initiator was then added to the ink precursor and shaken for 6 hours with a shaker so that the initiator was dissolved. The resulting liquid was filtered through a PTFE filter with a pore size of 0.5 µm so that coarse particles were removed. Each ink to be evaluated was prepared according to the description below.

The formula of the monomer mixture liquids were formulated below as Monomer Mixture Liquids 1 to 9. The formula of the polymerization initiators were also shown below as Initiators 1 to 9. Unless otherwise specified, the added amount of the polymerization initiator is shown in units of parts by weight based on 100 parts by weight of the ink precursor. Cyan and yellow ink compositions used in the evaluation of ink printing were prepared as described below.

In Table 2, the name of each ink corresponds to the name of each pigment dispersion in Table 1. The pigment dispersion contained in each ink shown in Table 2 is indicated by the name of the ink. For example, the inks A and A2 each contain the pigment dispersion A. The inks AB, AB2, and AB3 each contain the pigment dispersion AB.

For reference, Table 2 also shows the dispersing resin in the pigment dispersion contained in each ink, and the pigment color index.
(Monomer Mixture Liquid 1)
Laromer DPGDA (manufactured by BASF) 40 parts
VEEA (manufactured by NIPPON SHOKUBAI CO., LTD.) 40 parts
(Monomer Mixture Liquid 2)
Laromer DPGDA (manufactured by BASF) 40 parts
BISCOAT 260 (manufactured by OSAKA ORGANIC CHEMICAL INDUSTRY LTD.) 40 parts
(Monomer Mixture Liquid 3)
Laromer DPGDA (manufactured by BASF) 70 parts
V-Cap RC (manufactured by ISP) 10 parts
(Monomer Mixture Liquid 4)
VEEA-AI (manufactured by NIPPON SHOKUBAI CO., LTD.) 40 parts
BISCOAT 260 (manufactured by OSAKA ORGANIC CHEMICAL INDUSTRY LTD.) 40 parts
(Monomer Mixture Liquid 5)
VEEA (manufactured by NIPPON SHOKUBAI CO., LTD.) 40 parts
SR 595 (manufactured by Sartomer Company) 40 parts
(Monomer Mixture Liquid 6)
Laromer DPGDA (manufactured by BASF) 40 parts
VEEA (manufactured by NIPPON SHOKUBAI CO., LTD.) 25 parts
V-Cap RC (manufactured by ISP) 15 parts
(Monomer Mixture Liquid 7)
Laromer DPGDA (manufactured by BASF) 20 parts
BISCOAT 192 (manufactured by OSAKA ORGANIC CHEMICAL INDUSTRY LTD.) 60 parts
(Monomer Mixture Liquid 8)
Laromer DPGDA (manufactured by BASF) 60 parts
VEEA (manufactured by NIPPON SHOKUBAI CO., LTD.) 60 parts
(Monomer Mixture Liquid 9)
VEEA-AI (manufactured by NIPPON SHOKUBAI CO., LTD.) 60 parts
BISCOAT 260 (manufactured by OSAKA ORGANIC CHEMICAL INDUSTRY LTD.) 60 parts
(Monomer Mixture Liquid 10)
VEEA (manufactured by NIPPON SHOKUBAI CO., LTD.) 60 parts
SR 595 (manufactured by Sartomer Company) 60 parts
(Monomer Mixture Liquid 11)
Laromer DPGDA (manufactured by BASF) 40 parts
Lauryl acrylate (manufactured by OSAKA ORGANIC CHEMICAL INDUSTRY LTD.) 40 parts
Laromer DPGDA: Dipropylene glycol diacrylate
VEEA/VEEA-AI: 2-(2-hydroxyethoxy)ethyl acrylate
BISCOAT 260: 1,9-nonanediol diacrylate
SR 595: 1,10-nonanediol diacrylate
V-Cap RC: N-vinylcaprolactam
BISCOAT 192: Phenoxyethyl acrylate
(Initiator 1)
Darocur TPO (manufactured by BASF) 5 parts
Irgacure 819 (manufactured by BASF) 5 parts
(Initiator 2)
Irgacure 819 (manufactured by BASF) 5 parts
KAYACURE DETX-S (manufactured by Nippon Kayaku Co., Ltd.) 5 parts
(Initiator 3)
Darocur TPO (manufactured by BASF) 5 parts
SPEEDCURE ITX (manufactured by Lambson Ltd.) 5 parts (Initiator 4)
Darocur TPO (manufactured by BASF) 10 parts
Irgacure 819 (manufactured by BASF) 10 parts
(Initiator 5)
Irgacure 819 (manufactured by BASF) 10 parts
KAYACURE DETX-S (manufactured by Nippon Kayaku Co., Ltd.) 10 parts
(Initiator 6)
Darocur TPO (manufactured by BASF) 10 parts
SPEEDCURE ITX (manufactured by Lambson Ltd.) 10 parts
(Initiator 7)
Esacure ONE (manufactured by lamberti S.p.A.) 5 parts
Irgacure 369 (manufactured by BASF) 5 parts
(Initiator 8)
Irgacure 379 (manufactured by BASF) 5 parts
KAYACURE BMS (manufactured by Nippon Kayaku Co., Ltd.) 2.5 parts
SPEEDCURE EDB (manufactured by Lambson Ltd.) 2.5 parts
(Initiator 9)
Irgacure 2959 (manufactured by BASF) 5 parts
Darocure 1173 (manufactured by BASF) 2.5 parts
EAB (manufactured by Hodogaya Chemical Co., Ltd.) 2.5 parts
Darocur TPO: 2,4,6-trimethylbenzoyl-diphenyl-phosphine oxide
Irgacure 819: Bis(2,4,6-trimethylbenzoyl)-phenylphosphine oxide
KAYACURE DETX-S: 2,4-diethylthioxanthone
SPEEDCURE ITX: 2-isopropylthioxanthone
Esacure ONE: oligo(2-hydroxy-2-methyl-1-(4-(1-methylvinyl)phenyl)propanone
Irgacure 369: 2-benzyl-2-dimethylamino-1-(4-morpholinophenyl)-butanone-1
Irgacure 379: 2-dimethylamino-2-(4-methylbenzyl)-1-(4-morpholinophenyl)butane-1-one
KAYACURE BMS: [4-[(4-methylphenyl)thio]phenyl]phenylmethanone
SPEEDCURE EDB: p-dimethylaminobenzoic acid ethyl ester
Irgacure 2959: 1-[4-(2-hydroxyethoxy)phenyl]-2-hydroxy-2-methyl-1-propane-1-one
EAB: 4,4'-bis(dimethylamino)benzophenone (Preparation of Cyan and Yellow Ink)

Cyan and yellow ink were prepared in the same manner as for the ink A, except that LIONOL BLUE FG-7400G (phthalocyanine pigment manufactured by TOYO INK CO., LTD.) was used as the pigment for the cyan ink and that Novoperm Yellow P-HG (C.I. Pigment Yellow 180 manufactured by Clariant) was used as the pigment for the yellow ink.

(Measurement of Viscosity)

The viscosity of each prepared ink was measured by using an E-type viscometer manufactured by TOKI SANGYO CO., LTD. Under the measurement conditions, the rotational speed was adjusted to the desired value suitable for the measurement in a 25° C. circulating chiller environment, and 3 minutes after the adjustment, the viscosity was measured.

Ink stability: A rate of change in viscosity was determined after an acceleration test at 60° C. for 1 week. The rate of change in viscosity was calculated by the formula: [{(the viscosity after the storage at 60° C. for 1 week)−(the initial viscosity)}/(the initial viscosity)]×100, which is an indication of the storage stability of ink. ⊙ and ○ were determined to be acceptable levels of ink stability for practical use.
⊙: The rate of change in viscosity is less than 5%.
○: The rate of change in viscosity is from 5% to less than 10%.
Δ: The rate of change in viscosity is from 10% to less than 15%.
x: The rate of change in viscosity is 15% or more.

(Evaluation of Dischargeability)

The frequency characteristics were evaluated by observing how each ink was discharged from a head (KJ4A) manufactured by KYOCERA Corporation through electronic flash photography. Fire 1 mode was selected for the waveform. At the following time points, the evaluation was performed as described below. At the frequency of 5 kHz and 20 kHz, how droplets were broken up was observed at the start of discharge and after continuous discharge for 10 minutes.

Evaluation of droplet breakup: The state of droplets was observed at points 1 mm and 2 mm apart from the discharge point. In a preferred state, droplets are stable without being broken up. ⊙ and ○ were determined to be acceptable levels of dischargeability for practical use.
⊙: Droplets are stable and continuous, and are not broken up until they reach the 2 mm point.
○: Droplets are broken up at the 1 mm point, but gathered at the 2 mm point. Otherwise, the broken state is significantly changed from the beginning.
x: Droplets are broken up at the 1 mm point, and still not gathered at the 2 mm point. Discharge failure occurs at the beginning or after 10 minutes.

(Evaluation of Printing)

Each prepared ink composition was subjected to evaluation of printing with an ink droplet size of 14 pl using a single pass-type inkjet printer (manufactured by Incorporated Company Tritek) having: a discharge mechanism equipped with a head (KJ4A) manufactured by KYOCERA Corporation; a mechanism including a conveyer unit for feeding the printed material at the desired speed; and a mechanism for subsequently irradiating the printed material with a UV lamp. The evaluation was performed using each of two UV lamps: a metal halide lamp (140 W/cm) manufactured by Nordson Corporation and an LED lamp (385 nm, total dose at 10 m/s: 566 mW/cm$^2$) manufactured by Integration Technology Ltd. During the discharge, the head temperature was set at 40° C. in all cases. The printing material used was OK Top Coat N (manufactured by Oji Paper Co., Ltd.). The curing property and the chroma were evaluated using the resulting prints.

Curing property: The curing property was determined by a finger rubbing method when the conveyor speed was changed to 25 m/minute or 50 m/minute. ⊙ and ○ were determined to be acceptable levels of curing property for practical use.
⊙: The print is not blurred even when rubbed strongly.
○: The print is cured, but slightly blurred when rubbed strongly.
x: The print is not cured (fingers are stained with ink)

Chroma: The L*a*b* values of the resulting prints were measured at a viewing angle of 2° using a spectral colorimeter X-RITE 528 with a D50 light source. Using the magenta, yellow, and cyan ink compositions, the red region was defined as the hue of a 1:1 mixture of the magenta and yellow ink compositions, and the blue region was defined as the hue of a 1:1 mixture of the magenta and cyan ink compositions. The magenta, yellow, and cyan ink compositions were subjected to 100% solid printing. Comparisons with Japan Color 2007 and FOGRA 39 (European Color Standard) were performed on the magenta, red, and blue regions. In the comparison, it was evaluated whether or not the chroma $C=\sqrt{(a^{*2}+b^{*2})}$, calculated as a degree of vividness, was a relatively high value or outside each gamut. ⊙ and ○ were determined to be acceptable levels of chroma for practical use.

⊚: The chroma of all of the magenta, red, and blue regions is higher than Japan Color 2007 and FOGRA 39, and is outside each gamut.
◯: The chroma of one of the magenta, red, and blue regions is lower than Japan Color 2007 and FOGRA 39, and is inside one of the gamuts.
Δ: The chroma of two of the magenta, red, and blue regions is lower than Japan Color 2007 and FOGRA 39, and is inside two of the gamuts.
x: The chroma of all three of the magenta, red, and blue regions is lower than Japan Color 2007 and FOGRA 39, and is inside all of the three gamuts.

The evaluation results are shown in Table 2 (the examples) and Table 3 (the comparative examples). A satisfactory level of ink viscosity, stability, dischargeability, curing property, and chroma were achieved in each of Examples A to AB3. Each metal lake pigment of rhodamine dye was successfully dispersed, so that an ink with low viscosity and good dischargeability was obtained.

In Comparative Examples Q to V using other pigments, however, at least one of the dischargeability, curing property, and chroma was poor, and no ink suitable for single-pass curing was obtained. In Comparative Examples Q2 to V2, ink compositions with low chroma and poor color reproducibility were obtained although the viscosity, stability, and dischargeability of the ink were improved by reducing the pigment concentration. In Comparative Examples Q3 to V3, the amount of the initiator was increased so that the curing property was improved, but due to an increase in viscosity, ink with poor ink stability or poor dischargeability were obtained.

TABLE 1

| Pigment Dispersion | Color Index | Pigment Product Name | Manufacturer | Pigment Amount | Dispersing Resin Name* | Dispersing Resin Amount | Dispersing Monomer Name | Dispersing Monomer Amount |
|---|---|---|---|---|---|---|---|---|
| A | Pigment Red 81:2 | Fanal Pink D 4830 | BASF | 20.0 | DR-A | 12.5 | DPGDA | 67.5 |
| B | Pigment Red 81:2 | Fanal Pink D 4830 | BASF | 20.0 | DR-A | 37.5 | | 42.5 |
| C | Pigment Red 81:2 | Fanal Pink D 4830 | BASF | 20.0 | DR-A | 25.0 | | 55.0 |
| D | Pigment Red 81 | Fanal Rose Toner 170 | ARIMOTO CHEMICAL Co., Ltd. | 20.0 | DR-A | 25.0 | | 55.0 |
| E | Pigment Red 81/ Basic Red 12 | Pink MP617 | ARIMOTO CHEMICAL Co., Ltd. | 20.0 | DR-A | 25.0 | | 55.0 |
| F | Pigment Red 169 | Fanal Pink D 4810 | BASF | 20.0 | DR-A | 25.0 | | 55.0 |
| G | Pigment Violet 1 | Fanal Violet D5480 | BASF | 20.0 | DR-A | 25.0 | | 55.0 |
| H | Pigment Red 169 | Fanal Pink D 4810 | BASF | 20.0 | DR-A | 25.0 | | 55.0 |
| I | Pigment Red 169 | Fanal Pink D 4810 | BASF | 20.0 | DR-B | 20.0 | | 60.0 |
| J | Pigment Red 169 | Fanal Pink D 4810 | BASF | 20.0 | DR-C | 33.3 | | 46.7 |
| K | Pigment Red 169 | Fanal Pink D 4810 | BASF | 20.0 | DR-D | 10.0 | | 70.0 |
| L | Pigment Red 169 | Fanal Pink D 4810 | BASF | 20.0 | DR-E | 10.0 | | 70.0 |
| M | Pigment Red 169 | Fanal Pink D 4810 | BASF | 20.0 | DR-A | 10.0 | | 70.0 |
| N | Pigment Red 169 | Fanal Pink D 4810 | BASF | 20.0 | DR-A | 10.0 | VEEA | 70.0 |
| O | Pigment Red 169 | Fanal Pink D 4810 | BASF | 20.0 | DR-A | 10.0 | 1,10-DDDA | 70.0 |
| P | Pigment Red 169 | Fanal Pink D 4810 | BASF | 20.0 | DR-A | 10.0 | 1,9-NDDA | 70.0 |
| Q | Pigment Violet 19 | Hostaperm Red E5B 02 | Clariant | 20.0 | DR-A | 25.0 | DPGDA | 55.0 |
| R | Pigment Red 122 | Hostaperm Pink E | Clariant | 20.0 | DR-A | 25.0 | | 55.0 |
| S | Pigment Red 176 | Novoperm Carmine HF3C | Clariant | 20.0 | DR-D | 10.0 | | 70.0 |
| T | Pigment Red 185 | Novoperm Carmine HF4C | Clariant | 20.0 | DR-D | 10.0 | | 70.0 |
| U | Pigment Red 202 | Sunfast Magenta 202 | SUN Chemical | 20.0 | DR-E | 10.0 | | 70.0 |
| V | Pigment Red 269 | Fabriperm Naphthol Red 238-T | Fabricolor | 20.0 | DR-E | 10.0 | | 70.0 |
| W | Pigment Red 81:4 | No. 9310 PINK | Daido Chemical Corporation | 20.0 | DR-A | 25.0 | | 55.0 |
| X | Pigment Red 81:4 | No. 9310 PINK | Daido Chemical Corporation | 20.0 | DR-B | 20.0 | | 60.0 |
| Y | Pigment Red 81:4 | No. 9310 PINK | Daido Chemical Corporation | 20.0 | DR-C | 33.3 | | 46.7 |
| Z | Pigment Red 81:4 | No. 9310 PINK | Daido Chemical Corporation | 20.0 | DR-D | 10.0 | | 70.0 |
| AA | Pigment Red 81:3 | No. 9306 FANAL PINK | Daido Chemical Corporation | 20.0 | DR-A | 25.0 | | 42.5 |
| AB | Pigment Red 81:5 | Lumiere Pink S.M. 8135N | Cappelle | 20.0 | DR-A | 25.0 | | 75.0 |
| AC | Pigment Red 81:5 | Lumiere Pink S.M. 8135N | Cappelle | 20.0 | DR-A | 25.0 | VEEA | 55.0 |
| AD | Pigment Red 81:5 | Lumiere Pink S.M. 8136N | Cappelle | 20.0 | DR-A | 25.0 | 1,10-DDDA | 55.0 |
| AE | Pigment Red 81:5 | Lumiere Pink S.M. 8136N | Cappelle | 20.0 | DR-A | 25.0 | LA | 55.0 |

| *Description | Product Name | Active Ingredient | Diluent |
|---|---|---|---|
| DR-A | Solsperse J100 (manufactured by The Lubrizol Corporation) | 40% | Phenoxyethyl Acrylate |
| DR-B | Solsperse 76400 (manufactured by The Lubrizol Corporation) | 50% | Propylene Glycol Monomethyl Ether Acetate |
| DR-C | DISPERBYK-168 (manufactured by BYK Japan KK) | 30% | Dicarboxylic Ester |
| DR-D | Solsperse 32000 (manufactured by The Lubrizol Corporation) | 100% | Absent |
| DR-E | Solsperse 24000SC (manufactured by The Lubrizol Corporation) | 100% | Absent |

TABLE 2

Examples

| Ink | Color Index | Dispersing Resin | Monomer Mixture Liquid | Initiator | Ink Viscosity | Ink Stability | Dischargeability 5 KHz | Dischargeability 20 KHz | Curing Property Metal Halide 25 m/min | Metal Halide 50 m/min | LED 25 m/min | LED 50 m/min | Chroma |
|---|---|---|---|---|---|---|---|---|---|---|---|---|---|
| A | Pigment Red 81:2 | DR-A | 1 | 1 | 8.0 | ○ | ⊙ | ⊙ | ⊙ | ⊙ | ⊙ | ○ | ⊙ |
| B | Pigment Red 81:2 | DR-A | 1 | 2 | 8.6 | ⊙ | ⊙ | ⊙ | ⊙ | ⊙ | ⊙ | ○ | ⊙ |
| C | Pigment Red 81:2 | DR-A | 1 | 3 | 7.0 | ⊙ | ⊙ | ⊙ | ⊙ | ⊙ | ⊙ | ○ | ⊙ |
| D | Pigment Red 81 | DR-A | 2 | 1 | 10.3 | ⊙ | ⊙ | ⊙ | ⊙ | ⊙ | ⊙ | ○ | ⊙ |
| E | Pigment Red 81/ Basic Red 12 | DR-A | 2 | 1 | 10.5 | ⊙ | ⊙ | ⊙ | ⊙ | ⊙ | ⊙ | ○ | ⊙ |
| F | Pigment Red 169 | DR-A | 3 | 1 | 10.0 | ⊙ | ⊙ | ⊙ | ⊙ | ⊙ | ⊙ | ○ | ⊙ |
| G | Pigment Violet 1 | DR-A | 3 | 1 | 10.8 | ⊙ | ⊙ | ⊙ | ⊙ | ⊙ | ⊙ | ○ | ⊙ |
| H | Pigment Red 169 | DR-A | 4 | 1 | 8.9 | ⊙ | ⊙ | ⊙ | ⊙ | ⊙ | ⊙ | ○ | ⊙ |
| I | Pigment Red 169 | DR-B | 4 | 1 | 8.5 | ⊙ | ⊙ | ⊙ | ⊙ | ⊙ | ⊙ | ○ | ⊙ |
| J | Pigment Red 169 | DR-C | 5 | 1 | 6.2 | ⊙ | ⊙ | ⊙ | ⊙ | ⊙ | ⊙ | ○ | ⊙ |
| K | Pigment Red 169 | DR-D | 5 | 1 | 7.5 | ⊙ | ⊙ | ⊙ | ⊙ | ⊙ | ⊙ | ○ | ⊙ |
| L | Pigment Red 169 | DR-E | 6 | 1 | 10.2 | ⊙ | ⊙ | ⊙ | ⊙ | ⊙ | ⊙ | ○ | ⊙ |
| M | Pigment Red 169 | DR-A | 6 | 1 | 6.8 | ○ | ⊙ | ⊙ | ⊙ | ⊙ | ⊙ | ○ | ⊙ |
| N | Pigment Red 169 | DR-A | 7 | 1 | 11.3 | ○ | ⊙ | ⊙ | ⊙ | ⊙ | ⊙ | ○ | ⊙ |
| O | Pigment Red 169 | DR-A | 7 | 1 | 10.5 | ○ | ⊙ | ⊙ | ⊙ | ⊙ | ⊙ | ○ | ⊙ |
| P | Pigment Red 169 | DR-A | 1 | 1 | 9.5 | ○ | ⊙ | ⊙ | ⊙ | ⊙ | ⊙ | ○ | ⊙ |
| W | Pigment Red 81:4 | DR-A | 1 | 1 | 7.2 | ⊙ | ⊙ | ⊙ | ⊙ | ⊙ | ⊙ | ○ | ⊙ |
| X | Pigment Red 81:4 | DR-B | 1 | 7 | 7.0 | ⊙ | ⊙ | ⊙ | ⊙ | ⊙ | ⊙ | ○ | ⊙ |
| Y | Pigment Red 81:4 | DR-C | 1 | 8 | 7.6 | ⊙ | ⊙ | ⊙ | ⊙ | ⊙ | ⊙ | ○ | ⊙ |
| Z | Pigment Red 81:4 | DR-D | 1 | 9 | 8.2 | ⊙ | ⊙ | ⊙ | ⊙ | ⊙ | ⊙ | ○ | ⊙ |
| AA | Pigment Red 81:3 | DR-A | 1 | 1 | 7.2 | ⊙ | ⊙ | ⊙ | ⊙ | ⊙ | ⊙ | ○ | ⊙ |
| AB | Pigment Red 81:5 | DR-A | 1 | 1 | 7.4 | ⊙ | ⊙ | ⊙ | ⊙ | ⊙ | ⊙ | ○ | ⊙ |
| AC | Pigment Red 81:5 | DR-A | 1 | 7 | 6.8 | ⊙ | ⊙ | ⊙ | ⊙ | ⊙ | ⊙ | ○ | ⊙ |
| AD | Pigment Red 81:5 | DR-A | 1 | 8 | 7.8 | ⊙ | ⊙ | ⊙ | ⊙ | ⊙ | ⊙ | ○ | ⊙ |
| AE | Pigment Red 81:5 | DR-A | 11 | 9 | 7.9 | ⊙ | ⊙ | ⊙ | ⊙ | ⊙ | ⊙ | ○ | ⊙ |
| A2 | Pigment Red 81:2 | DR-A | 8 | 1 | 6.5 | ○ | ⊙ | ⊙ | ⊙ | ⊙ | ⊙ | ○ | ○ |
| B2 | Pigment Red 81:2 | DR-A | 8 | 2 | 6.9 | ⊙ | ⊙ | ⊙ | ⊙ | ⊙ | ⊙ | ○ | ○ |
| C2 | Pigment Red 81:2 | DR-A | 9 | 3 | 6.0 | ⊙ | ⊙ | ⊙ | ⊙ | ⊙ | ⊙ | ○ | ○ |
| D2 | Pigment Red 81 | DR-A | 9 | 1 | 6.7 | ⊙ | ⊙ | ⊙ | ⊙ | ⊙ | ⊙ | ○ | ○ |
| E2 | Pigment Red 81/ Basic Red 12 | DR-A | 10 | 1 | 7.8 | ⊙ | ⊙ | ⊙ | ⊙ | ⊙ | ⊙ | ○ | ○ |
| F2 | Pigment Red 169 | DR-A | 10 | 1 | 7.6 | ⊙ | ⊙ | ⊙ | ⊙ | ⊙ | ⊙ | ○ | ○ |
| W2 | Pigment Red 81:4 | DR-A | 8 | 1 | 6.6 | ⊙ | ⊙ | ⊙ | ⊙ | ⊙ | ⊙ | ○ | ○ |
| AB2 | Pigment Red 81:5 | DR-A | 8 | 1 | 6.8 | ⊙ | ⊙ | ⊙ | ⊙ | ⊙ | ⊙ | ○ | ○ |
| A3 | Pigment Red 81:2 | DR-A | 1 | 4 | 9.8 | ○ | ⊙ | ⊙ | ⊙ | ⊙ | ⊙ | ○ | ○ |
| B3 | Pigment Red 81:2 | DR-A | 1 | 4 | 10.2 | ○ | ⊙ | ⊙ | ⊙ | ⊙ | ⊙ | ○ | ○ |
| C3 | Pigment Red 81:2 | DR-A | 1 | 5 | 9.5 | ○ | ⊙ | ⊙ | ⊙ | ⊙ | ⊙ | ○ | ○ |
| D3 | Pigment Red 81 | DR-A | 2 | 5 | 11.5 | ○ | ⊙ | ⊙ | ⊙ | ⊙ | ⊙ | ○ | ○ |
| E3 | Pigment Red 81/ Basic Red 12 | DR-A | 2 | 6 | 11.6 | ○ | ⊙ | ⊙ | ⊙ | ⊙ | ⊙ | ○ | ○ |
| F3 | Pigment Red 169 | DR-A | 3 | 6 | 11.0 | ○ | ⊙ | ⊙ | ⊙ | ⊙ | ⊙ | ○ | ○ |
| W3 | Pigment Red 81:4 | DR-A | 1 | 6 | 10.8 | ○ | ⊙ | ⊙ | ⊙ | ⊙ | ⊙ | ○ | ○ |
| AB3 | Pigment Red 81:5 | DR-A | 1 | 6 | 10.6 | ○ | ⊙ | ⊙ | ⊙ | ⊙ | ⊙ | ○ | ○ |

TABLE 3

Comparative Examples

| Ink | Color Index | Dispersing Resin | Monomer Mixture Liquid | Initiator | Ink Viscosity | Ink Stability | Dischargeability 5 KHz | Dischargeability 20 KHz | Curing Property Metal Halide 25 m/min | Metal Halide 50 m/min | LED 25 m/min | LED 50 m/min | Chroma |
|---|---|---|---|---|---|---|---|---|---|---|---|---|---|
| Q | Pigment Violet 19 | DR-A | 1 | 1 | 13.0 | ○ | ⊙ | ○ | ○ | X | ○ | X | Δ |
| R | Pigment Red 122 | DR-A | 1 | 2 | 13.5 | ○ | ⊙ | ○ | ○ | X | ○ | X | Δ |
| S | Pigment Red 176 | DR-D | 4 | 3 | 14.5 | Δ | ○ | X | ○ | X | ○ | X | X |
| T | Pigment Red 185 | DR-D | 4 | 1 | 16.0 | X | ○ | X | ○ | X | ○ | X | X |
| U | Pigment Red 202 | DR-E | 5 | 1 | 14.5 | X | ⊙ | X | ○ | X | ○ | X | X |
| V | Pigment Red 269 | DR-E | 5 | 1 | 14.9 | X | ⊙ | X | ○ | X | ○ | X | X |
| Q2 | Pigment Violet 19 | DR-A | 8 | 1 | 10.1 | ○ | ⊙ | ⊙ | ○ | X | ○ | X | X |
| R2 | Pigment Red 122 | DR-A | 8 | 2 | 10.5 | ○ | ⊙ | ⊙ | ○ | X | ○ | X | X |
| S2 | Pigment Red 176 | DR-D | 9 | 3 | 11.0 | ○ | ⊙ | ⊙ | ○ | X | ○ | X | X |
| T2 | Pigment Red 185 | DR-D | 9 | 1 | 12.3 | Δ | ⊙ | ⊙ | ○ | X | ○ | X | X |
| U2 | Pigment Red 202 | DR-E | 10 | 1 | 11.2 | Δ | ⊙ | ⊙ | ○ | X | ○ | X | X |
| V2 | Pigment Red 269 | DR-E | 10 | 1 | 11.3 | Δ | ⊙ | ⊙ | ○ | X | ○ | X | X |
| Q3 | Pigment Violet 19 | DR-A | 1 | 4 | 15.0 | X | ○ | X | ⊙ | ○ | ⊙ | X | X |
| R3 | Pigment Red 122 | DR-A | 1 | 4 | 15.6 | X | ○ | X | ⊙ | ○ | ⊙ | X | X |

TABLE 3-continued

Comparative Examples

| Ink | Color Index | Dispersing Resin | Monomer Mixture Liquid | Initiator | Ink Viscosity | Ink Stability | Dischargeability 5 KHz | Dischargeability 20 KHz | Curing Property Metal Halide 25 m/min | Curing Property Metal Halide 50 m/min | Curing Property LED 25 m/min | Curing Property LED 50 m/min | Chroma |
|---|---|---|---|---|---|---|---|---|---|---|---|---|---|
| S3 | Pigment Red 176 | DR-D | 4 | 5 | 16.2 | X | ○ | X | ⊙ | ○ | ○ | X | X |
| T3 | Pigment Red 185 | DR-D | 4 | 5 | 17.0 | X | ○ | X | ⊙ | ○ | ○ | X | X |
| U3 | Pigment Red 202 | DR-E | 5 | 6 | 15.2 | X | ○ | X | ⊙ | ○ | ○ | X | X |
| V3 | Pigment Red 269 | DR-E | 5 | 6 | 15.6 | X | ○ | X | ⊙ | ○ | ○ | X | X |

What is claimed is:

1. An active energy ray-curable inkjet ink composition, comprising:
   a pigment comprising a metal lake pigment of a rhodamine dye, and
   an active energy ray-curable monomer,
   wherein:
   the ink composition is a magenta ink composition,
   the ink composition comprises 0.5% by weight to 10% by weight of the metal lake pigment, and
   the metal lake pigment is selected from the group consisting of Pigment Violet 1, Pigment Violet 1:1, Pigment Violet 2, Pigment Violet 2:2, Pigment Red 81, Pigment Red 81:1, Pigment Red 81:2, Pigment Red 81:3, Pigment Red 81:4, Pigment Red 81:5, Pigment Red 169, and Pigment Red 173.

2. The active energy ray-curable inkjet ink composition according to claim 1, further comprising a resin-type pigment dispersing agent having a urethane skeleton.

3. The active energy ray-curable inkjet ink composition according to claim 1, wherein the active energy ray-curable monomer comprises a monofunctional monomer, a bifunctional monomer, or both.

4. The active energy ray-curable inkjet ink composition according to claim 1, further comprising an initiator or a sensitizer,
   wherein the initiator and the sensitizer are each independently selected from the group consisting of 2,4,6-trimethylbenzoyldiphenylphosphine oxide, 2,4-diethylthioxanthone, 2-isopropylthioxanthone, bis(2,4,6-trimethylbenzoyl)phenylphosphine oxide, 2,4,6-trimethylbenzoyldiphenylphosphine oxide, 2-benzyl-2-dimethylamino-1-(4-morpholinophenyl)-butanone-1,2-dimethylamino-2-(4-methylbenzyl)-1-(4-morpholinophenyl)butane-1-one, [4-[(4-methylphenyl)thio]phenyl]phenylmethanone, oligo(2-hydroxy-2-methyl-1-(4-(1-methylvinyl)phenyl)propanone, 1-[4-(2-hydroxyethoxy)phenyl]-2-hydroxy-2-methyl-1-propane-1-one, p-dimethylaminobenzoic acid ethyl ester, and 4,4'-bis(dimethylamino)benzophenone, and
   if the initiator is present, the ink composition comprises from 2% by weight to 25% by weight of the initiator based on monomer weight.

5. The active energy ray-curable inkjet ink composition according to claim 1, wherein the active energy ray-curable monomer comprises at least one compound selected from the group consisting of lauryl acrylate, 1,9-nonanediol diacrylate, 1,10-decanediol diacrylate, tripropylene glycol diacrylate, dipropylene glycol diacrylate, PO-modified neopentyl glycol diacrylate, EO-modified 1,6-hexanediol diacrylate, PO-modified 1,6-hexanediol diacrylate, tert-butylcyclohexyl acrylate, 2-(2-vinyloxyethoxy)ethyl acrylate, and tridecyl acrylate.

6. The active energy ray-curable inkjet ink composition according to claim 1, wherein the active energy ray-curable monomer comprises at least one compound selected from the group consisting of dipropylene glycol diacrylate, 1,9-nonanediol diacrylate, 1,10-decanediol diacrylate, 2-(2-vinyloxyethoxy)ethyl acrylate, and lauryl acrylate.

7. The active energy ray-curable inkjet ink composition according to claim 1, comprising 5% by weight or less of water.

8. An active energy ray-curable inkjet ink composition, comprising:
   a pigment comprising a metal lake pigment of a rhodamine dye, and
   an active energy ray-curable monomer,
   wherein:
   the ink composition is a magenta ink composition,
   the ink composition comprises 0.5% by weight to 10% by weight of the metal lake pigment, and
   the metal lake pigment is selected from the group consisting of Pigment Red 81, Pigment Red 81:1, Pigment Red 81:2, Pigment Red 81:3, Pigment Red 81:4, Pigment Red 81:5, Pigment Red 169, and Pigment Red 173.

* * * * *